(12) United States Patent
Suzuki

(10) Patent No.: US 7,336,693 B2
(45) Date of Patent: Feb. 26, 2008

(54) COMMUNICATION SYSTEM USING ULTRA WIDEBAND SIGNALS

(75) Inventor: Mitsuhiro Suzuki, Chiba (JP)

(73) Assignee: Sony Corporation (JP)

( * ) Notice: Subject to any disclaimer, the term of this patent is extended or adjusted under 35 U.S.C. 154(b) by 544 days.

(21) Appl. No.: 10/138,153

(22) Filed: May 2, 2002

(65) Prior Publication Data

US 2002/0167991 A1   Nov. 14, 2002

(30) Foreign Application Priority Data

May 8, 2001   (JP)   ............................ P2001-177782

(51) Int. Cl.
*H04B 1/00* (2006.01)
(52) U.S. Cl. ................................................. 375/130
(58) Field of Classification Search ............... 375/130, 375/131, 135, 136, 139, 140, 146, 147, 141, 375/145, 149; 370/320, 335, 342, 441; 455/39, 455/71, 118, 130, 131, 313, 314
See application file for complete search history.

(56) References Cited

U.S. PATENT DOCUMENTS 4,559,633 A * 12/1985 Kan et al. .................... 375/145
5,940,432 A * 8/1999 Saito et al. .................. 375/148
6,580,748 B1 * 6/2003 Muraoka ..................... 375/141
6,782,035 B1 * 8/2004 Nakamura et al. .......... 375/130

FOREIGN PATENT DOCUMENTS

| JP | 07-143031 | 6/1995 |
| JP | 07-177057 | 7/1995 |
| JP | 07-297757 | 11/1995 |
| JP | 09-091392 | 4/1997 |
| JP | 10-041918 | 2/1998 |
| JP | 10-313289 | 11/1998 |

* cited by examiner

*Primary Examiner*—Sam K. Ahn
(74) *Attorney, Agent, or Firm*—Lerner, David, Littenberg, Krumholz & Mentlik, LLP

(57) ABSTRACT

A transmitter and receiver carry out ultra wideband communications. The transmitter includes a generator of a chip clock, a generator of a spreading code sequence of a fixed chip rate by using the chip clock, and a frequency converter of a carrier wave frequency, being synchronous with the chip clock, by a transmission signal spread-modulated by the spreading code sequence. The receiver includes a generator of a chip clock synchronous in timing with a received signal, a generator of a spreading code sequence of a fixed chip rate by using the chip clock, a frequency converter of the received signal by using a regenerated carrier wave signal synchronous with the chip clock, and a despreading unit of the received signal frequency-converted by using the spreading code sequence.

4 Claims, 10 Drawing Sheets

COMMUNICATION SYSTEM USING ULTRA WIDEBAND SIGNALS

BACKGROUND OF THE INVENTION

1. Field of the Invention

The present invention relates to a wireless communications device and method for use in digital wireless communications systems.

2. Description of the Related Art

Widespread use of cellular phones, pagers, and other mobile communications devices in recent years has produced an explosive increase in the number of users of such devices. On the other hand, there remains difficulty for further growth in that introduction of any new wireless communications system today cannot rid itself of a conundrum of assigning frequency bands not used by existing wireless systems.

It is against this background that the Ultra Wideband (UWB) transmission system is capturing attention as new wireless technology that can make effective use of limited frequency resources. The UWB transmission system basically uses signals made up of pulse strings of very fine pulse widths (for example, 1 ns (nanosecond) or less) to carry out base band transmission.

Also, the UWB is a bandwidth of such order of GHz that a value obtained by dividing the occupied bandwidth by its central frequency (for example, 1 GHz to 10 GHz) comes to approximately 1, and by comparison with the bandwidth used for wireless LAN employing the so-called W-CDMA, cdma2000, and Spread Spectrum (SP) or Orthogonal Frequency Division Multiplexing (OFDM), it occupies an ultra-wide bandwidth.

Further, since the UWB transmission system has a characteristic of low signal power density which makes it difficult to interfere with other wireless systems, it is expected that the UWB transmission system may be used while overlaying frequency bands currently used by the existing wireless system. Still further, it is also expected that its ultra-wide band feature provides a basis of a super high-speed wireless transmitting technique of 100 Mbps level for use in the Personal Area Network (PAN).

Now, as a modulation system using the UWB transmission system, there is, for example, the Pulse Position Modulation (PPM) disclosed in Japanese Patent Laid Open No. 98-508725 and U.S. Pat. No. 6,026,125, which indicates 0/1 information using signals with the pulse generating timing delicately staggered forward or back. As another modulation system, there is proposed the Bi-phase Modulation arranged to indicate 0/1 information by changing a pulse phase.

The Direct Spread (DS) system, one type of a spread spectrum (SS) system, is designed to spread occupied bandwidth and transmit information signals by multiplying the information signals by a random code sequence called the Pseudo Noise (PN) code. On the receiving end, the received spread information signals are multiplied by the PN code to de-spread so as to reproduce the information signals.

The UWB transmission method is a system that increases the spread rate of the information signals to a upper limit. Since the signals spread by the UWB transmission system only have power below the noise level in every frequency range, the communications system based on the UWB transmission system is advantageous in that its coexistence with other communications systems is relatively easy.

An example of transmission using the UWB system is shown in FIG. 10. Inputted information 1001 is spread by a spreading code sequence 1002. Depending on a configuration of system that uses the UWB system, this step of spreading code sequence multiplication may be omitted.

An information signal 1003 subjected to spread spectrum operation is modulated by using an impulse signal (wavelet pulse) 1004 according to the UWB system. For the modulation system, the Pulse Position Modulation (PPM), phase modulation, amplitude modulation and the like may be utilized.

Since the impulse signals used in the UWB system consist of very fine (narrow) pulses, a very wide band is used in terms of frequency spectrum, thereby leading to the inputted information signals having power under the noise level in every frequency range.

Although a received signal 1005 is mixed in noise, it can be detected by calculating a correlation value between the received signal and the impulse signal. Further, since signal spreading is performed in a number of systems, many impulse signals are transmitted with respect to 1 bit of transmitting information, thereby making it possible to integrate a receiving correlation value 1006 of the impulse signal further for the length of the spreading code sequence and thus making it easier to detect transmission signals much easier.

FIG. 11 shows a configuration example of a wireless communications terminal using the UWB system. A wireless terminal 1101 is configured to have elements 1111-1114 for transmitting, elements 1103-1108 for receiving, further a transmit/receive timing control section 1109, an RF section 1102, and a central control unit 1110.

In transmitting, after information to be transmitted is processed for information source coding 1114 and channel coding 1113, it is stored in an information buffer 1112, inputted into a pulse circuit generator 1111, and transmitted at a proper timing.

Also, in receiving, calculation of the correlation value between a received signal and a UWB impulse signal is performed, its output being integrated for the number of pulses of 1 bit of transmission signals 1104. Thereafter, the output of the integrated value is subjected to A/D conversion 1105, stored in a receiving buffer 1106, and the information stored in the receiving buffer is decoded via channel decoding 1107 and information source decoding 1108.

Further, in the RF section 1102, there are performed processes such as transmit/receive changeover, transmit/receive filter processing, and signal amplification.

FIG. 12 is a block diagram showing a more detailed configuration of a receiver according to the UWB communications system. FIG. 13 is a diagram showing correlation characteristics at a principal part 1609 of a timing synchronous circuit having a configuration of the so-called Delay Lock Loop (DLL) of the receiver shown in FIG. 12.

A radio signal is received by an antenna 1201, and the received signal, after any unnecessary component is eliminated in a band pass filter 1202, is outputted to multipliers 1207, 1213, and 1210.

A spreading code generator 1204 outputs a spreading code sequence (the same spreading code sequence as the spreading code sequence used in the transmitter shown in FIG. 10) at a frequency of a synthesizer 1203 to a pulse generator 1205. In the pulse generator 1205, a pulse is generated, and at the same time, the spreading code sequence outputted from the spreading code generator 1204 is overlaid on the pulse and outputted to delay units 1206 and 1212 and also to a multiplier 1210.

In the delay unit 1206, the pulse, on which the spreading code sequence was overlaid, is delayed by a width of ½ pulse and outputted to 1207. Also, In the delay unit 1212, the pulse, on which the spreading code sequence was overlaid, is delayed by a width of 1 pulse and outputted to the multiplier 1213.

Consequently, the pulse, on which the spreading code sequence was overlaid for demodulating transmitting data, is multiplied by the received signal and despread processing is performed. Also, in the multiplier 1210, the pulse, on which the spreading code sequence was overlaid, is multiplied by the received signal at a timing of a ½ pulse width in advance of the output of the delay unit 1206, and despread processing is performed.

The result of multiplication of the multiplier 1207 is outputted to an integrator 1208 to be integrated thereby, and outputted as receiving data. The result of multiplication of the multiplier 1210 is outputted to an integrator 1211, integrated thereby, and outputted to a differentiator 1215 (1302 in FIG. 13). The result of multiplication of the multiplier 1213 is outputted to an integrator 1214, integrated thereby, and outputted to a differentiator 1215 (1301 in FIG. 13).

A difference between the output of the integrator 1211 and the output of the integrator 1214 (1303 in FIG. 13 in a solid line) is calculated at the differentiator 1215, and the result is outputted to a loop filter 1216. As apparent from FIG. 13, with respect to a phase shift (transverse axis), the output In the synthesizer 1203, it is so controlled that if the loop filter 1216 output is positive, the generated phase of the spreading code sequence is slightly delayed, and if it is negative, the generated phase of the spreading code sequence is slightly advanced. This operation enables the loop filter 1216 output (difference) to become zero, and the pulses, on which the spreading code sequence to be supplied to the multiplier 1207 was overlaid, fall in agreement with the phase of the received signal, thus maximizing the despread output.

SUMMARY OF THE INVENTION

In an apparatus based on the Ultra Wideband system using the pulse, because the pulse is very fine, the pulse generating circuit and the detection circuit of the pulse position become complicated. Another problem is that these extremely fine pulses make it difficult to stabilize the pulse width in the pulse generating circuit, causing the spectrum shape to be unstable.

Still further, it is necessary to obtain synchronization between a chip clock of the spreading code sequence and a pulse clock. Also, amounts of delay in the delay unit 1206 and the delay unit 1212 used in the principal part 1209 of the timing synchronous circuit based on the DLL construction are determined by the value based on a pulse width Tp, and an S curve shown in a solid line in FIG. 13 likewise becomes thin in the same way as the pulse width, wherefore an insensitive zone (reticulated portions in FIG. 13) takes place in a part having no signals, thus creating a problem of making the circuit complicated. Furthermore, the fact of being pulse signals causes the transmission signals to become intermittent, thus creating a problem of high instantaneous transmission power. Moreover, because signals not desired to be radiated as radio waves are generated in large quantities, there is a problem that the circuit eliminating such signals becomes complicated.

The present invention is directed to solve or alleviate the above mentioned problems. It is desirable to provide a wireless communications device or method having simpler circuitry and causing no problems stemming from fine pulses. It is also desirable to provide an apparatus and/or method that enable wireless communications by using the ultra wideband signals.

The present invention is directed to a wireless communications an apparatus and method for use in digital wireless communications systems, and specifically to an apparatus and method that enables a ultra wideband communications without using pulse.

According to the first aspect of the present invention, a communication apparatus and/or method for carrying out communications using ultra wideband signals are provided. The communication apparatus and/or method include, at transmitting side, a unit for generating a chip clock, a unit for generating a spreading code sequence of a fixed chip rate by using the chip clock; and a unit for performing frequency conversion of a carrier wave frequency, which is synchronous with the chip clock, by a transmission signal that is spread-modulated by the spreading code sequence. In this case, the unit for generating the chip clock may comprise a synthesizer and a divider, and an output frequency of the synthesizer may be directly used as the chip clock (i.e. one division).

According to the second aspect of the present invention, another communication apparatus and/or method for carrying out communications using ultra wideband signals are provided. The communication apparatus and/or method include, at transmitting side, a synthesizer generating an oscillating signal of a frequency T, a divider generating a clock signal of a frequency T/n by receiving the oscillating signal and conducting a division thereof, a spreading code generator generating a spreading code sequence signal by using the clock signal, a first multiplier generating a spread spectrum signal by receiving a baseband signal and the spreading code sequence signal, and multiplying the baseband signal by the spreading code sequence signal, and a second multiplier generating a frequency converting signal by receiving the spread spectrum signal and the oscillating signal or a carrier wave signal of a frequency T/m, and by multiplying the spread spectrum signal by the oscillating signal or the carrier wave signal, the carrier wave signal being obtained by dividing the oscillating signal. In this case, the divider divides a signal from the synthesizer and generates the clock signal and the carrier wave signal. Alternatively, the transmitting frequency of the synthesizer may be directly used (i.e. one division where n=1 and m=1).

According to the third aspect of the present invention, a communication apparatus and/or method for carrying out communications using ultra wideband signals are provided. The communication apparatus and/or method include, at receiving side, a unit for generating a chip clock synchronous in timing with a received signal, a unit for generating a spreading code sequence of a fixed chip rate by using the chip clock, a unit for converting a frequency of the received signal by using a regenerated carrier wave signal synchronous with the chip clock, and a unit for performing despreading process to the received signal, which is frequency-converted, by using the spreading code sequence.

According to the fourth aspect of the present invention, a communication apparatus and/or method for carrying out communications using ultra wideband signals are provided. The communication apparatus and/or method include, at receiving side, a synthesizer generating an oscillating signal of a frequency T, a divider generating a clock signal of a frequency T/n by receiving from the synthesizer the oscillating signal synchronous in timing with a carrier receiving signal and conducting a division thereof, a spreading code generator generating a despreading code sequence signal by using the clock signal, a first multiplier generating a receiving spread spectrum signal by receiving a received signal and multiplying the received signal by the oscillating signal or a regenerated carrier wave signal of a frequency T/m obtained by dividing the oscillating signal, and a second multiplier generating a despreading signal by multiplying the receiving spread spectrum signal by the despreading code sequence signal.

Other objects and features of the present invention will appear in course of the description thereof which follows.

DESCRIPTION OF THE PREFERRED EMBODIMENT

It is one of main features of the present invention that a spread spectrum signal having a chip rate of several GHz is subjected to frequency conversion by a carrier synchronous with a chip clock to produce a ultra wideband transmission signal. A frequency of the carrier may be selected as a multiple of the chip rate (rational number multiple).

On the receiving end, the chip clock and the carrier are made to synchronize with each other, and the carrier synchronization is achieved by sharing circuitry that synchronizes with the chip clock. The circuitry may be a timing synchronous circuit.

A preferred embodiment of the present invention will be described in detail with reference to the accompanying drawings.

Figure 1:
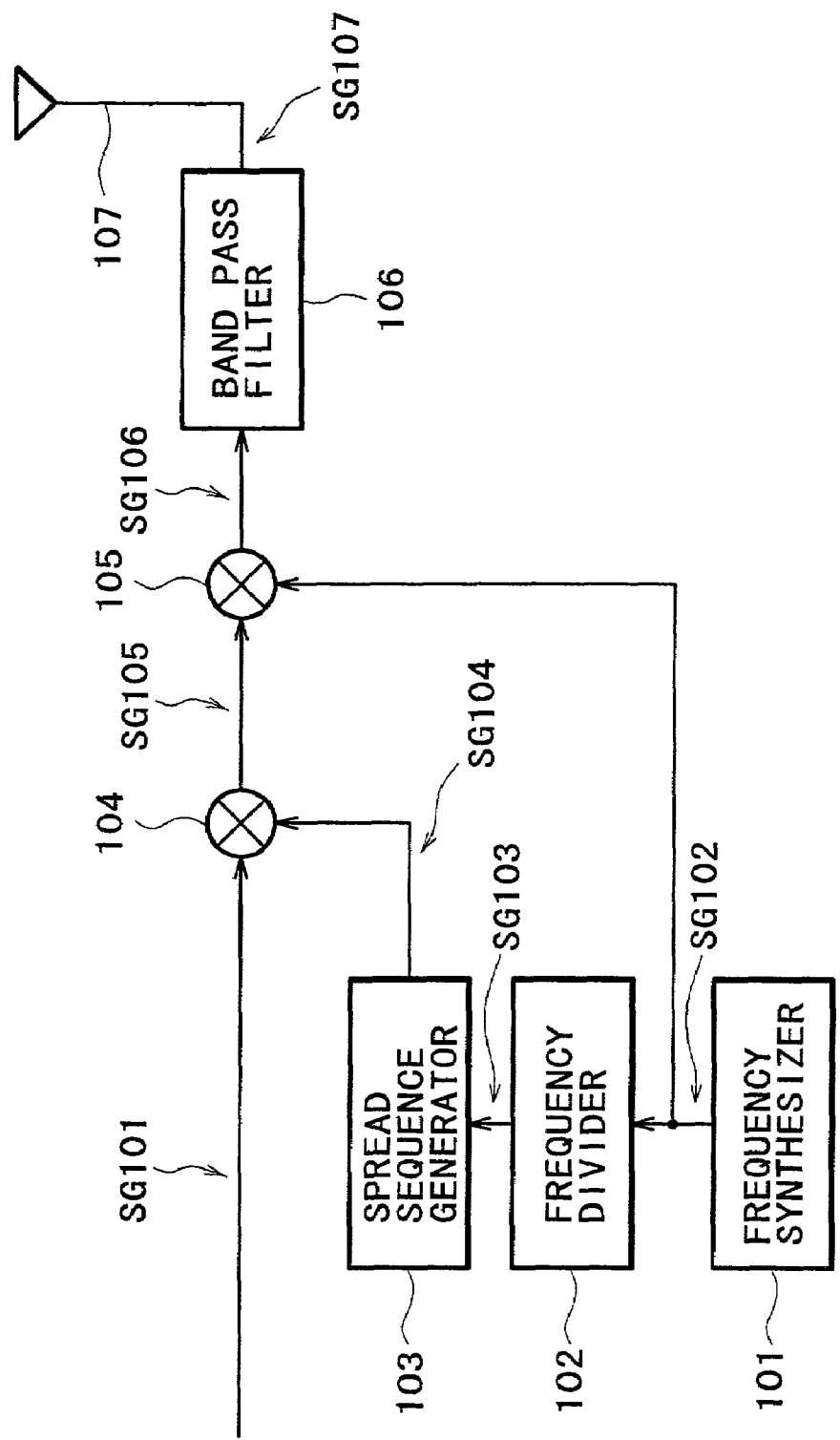
FIG. 1 is a block diagram showing a configuration of a wireless communications device (transmitter) according to a spread spectrum communications system associated with a preferred embodiment of the present invention.
Figure 2:
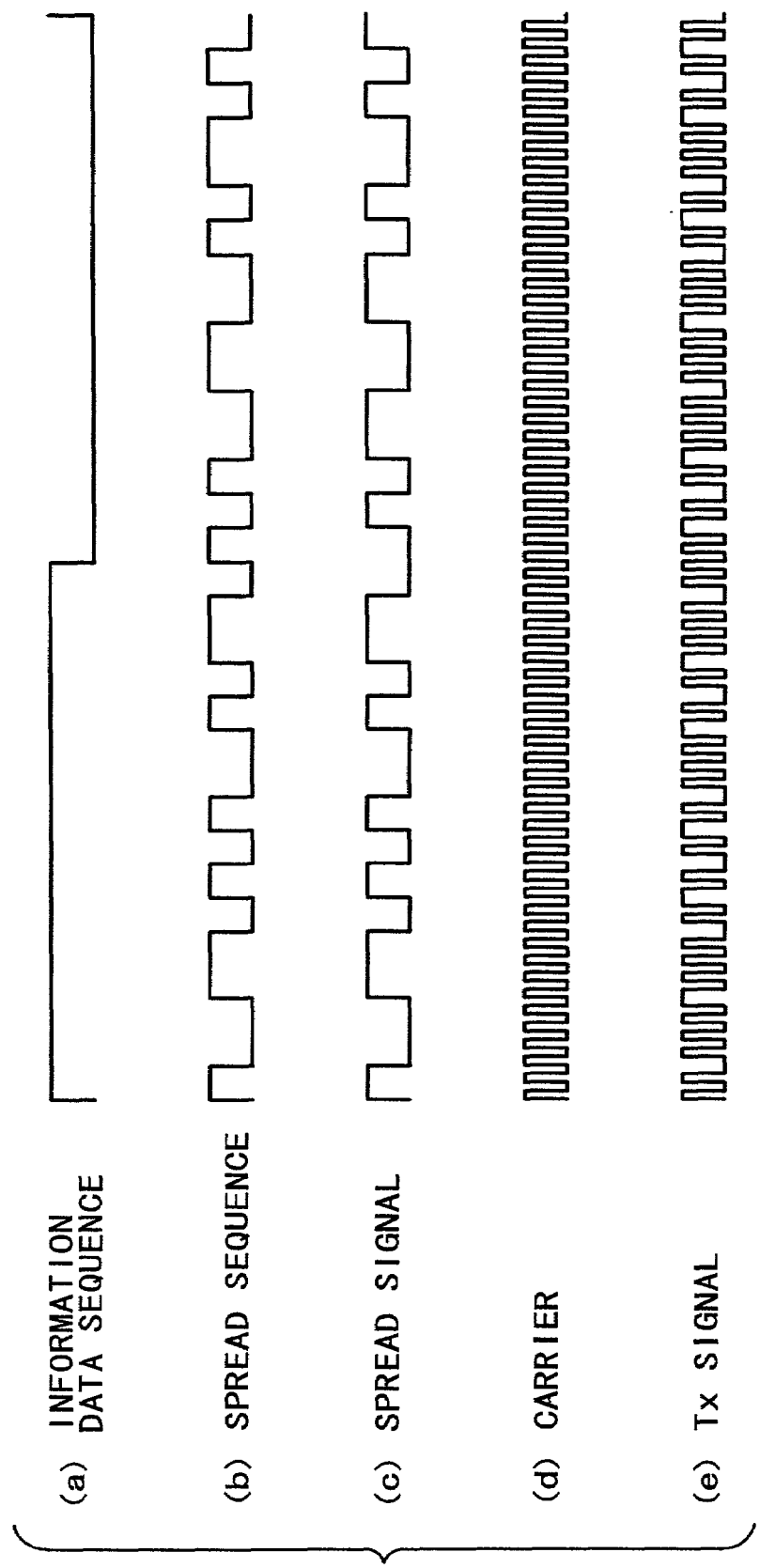
FIG. 2 is a diagram showing signals in the wireless communications device shown in FIG. 1.
Figure 3:
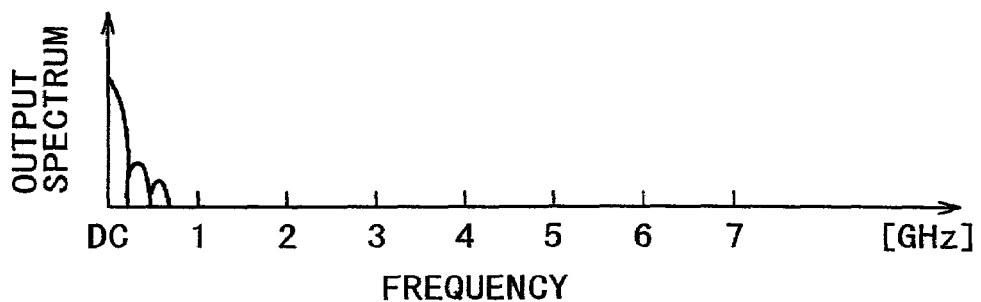
FIG. 3 is a diagram showing a signal spectrum of a data sequence in the wireless communications device shown in FIG. 1.
Figure 4:
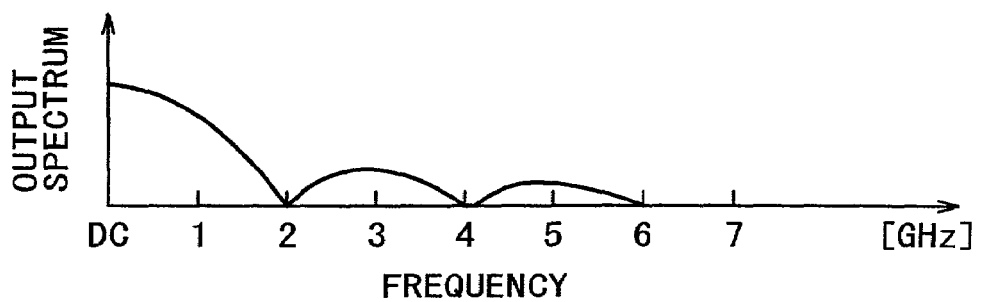
FIG. 4 is a diagram showing a signal spectrum of a spreading signal in the wireless communications device shown in FIG. 1.
Figure 5:
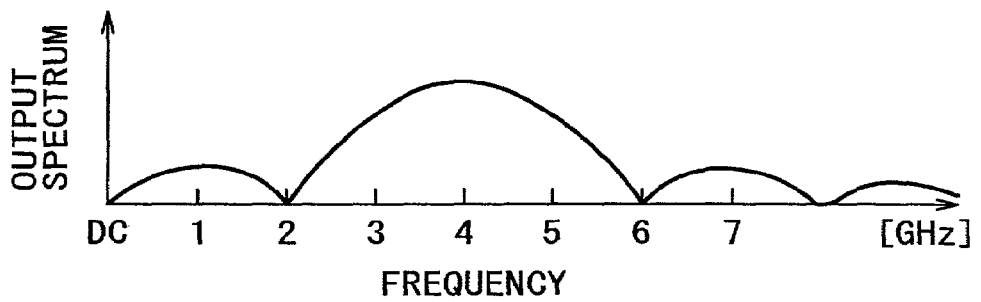
FIG. 5 is a diagram showing a signal spectrum of a carrier in the wireless communications device shown in FIG. 1.
Figure 6:
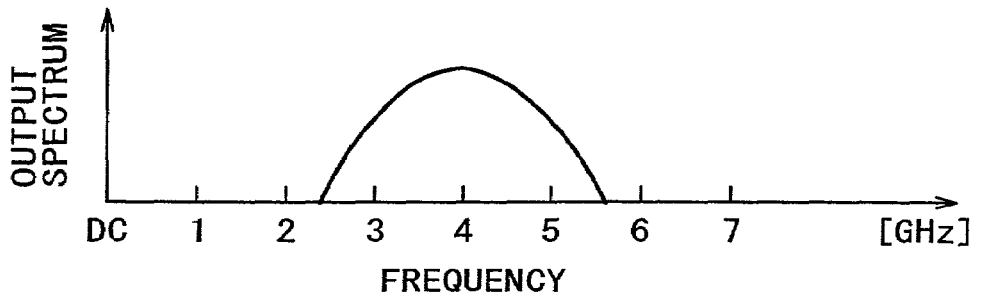
FIG. 6 is a diagram showing a signal spectrum of a spreading signal modulated by a spreading signal in the wireless communications device shown in FIG. 1.

FIG. 1 is a block diagram showing a configuration of a wireless communications device (transmitter) according to a spread spectrum communications system in accordance with the preferred embodiment of the present invention. FIG. 2 is a diagram showing a signal waveform at sections of the wireless communications device shown in FIG. 1. FIG. 3 is a diagram showing a signal spectrum of a data sequence in the wireless communications device shown in FIG. 1. FIG. 4 is a diagram showing a signal spectrum of a spreading signal in the wireless communications device shown in FIG. 1. FIG. 5 is a diagram showing a signal spectrum of a carrier in the wireless communications device shown in FIG. 1. FIG. 6 is a diagram showing a signal spectrum of the carrier modulated by a spreading signal in the wireless communications device shown in FIG. 1.

The wireless communications device shown in FIG. 1 comprises a synthesizer 101 that includes an oscillator, a divider 102 dividing a frequency of the synthesizer 101, a spreading code generator 103 generating a spreading code sequence by the divided frequency, a multiplier 104 multiplying the spreading code sequence by the transmission signal, a multiplier 105 modulating a carrier by the spreading signal, a band pass filter 106 eliminating unnecessary components, and an antenna 107 sending transmission signals.

Operation of the wireless communications device based on the configuration will be described.

The divider 102 divides a frequency of the synthesizer 101 and outputs a chip clock to the spreading code generator 103, where the synthesizer 101 oscillates with a frequency of 4 GHz and outputs a carrier SG102 (FIG. 2 (*d*)) to the multiplier 105. The divider 102 divides the frequency of 4 GHz oscillated by the synthesizer 101 by ½ (namely, 2 divisions) to make a 2 GHz chip clock SG103 and outputs it to the spreading code generator 103.

The chip clock is generated by dividing the oscillating frequency of the synthesizer and the synthesizer's oscillating signal is used as the carrier (carrier wave), therefore, the chip clock and the carrier synchronize with each other.

In the spreading code generator 103, a spreading code sequence SG104 (FIG. 2(*b*)) is outputted to the multiplier 104 using the 2 GHz chip clock. In the multiplier 104, for example, a transmitting data sequence SG101 of 125 Mbps (FIG. 2 (*a*) and FIG. 3) is multiplied (spread modulated) by the spreading code sequence SG104 and produces a spreading signal SG105 (FIG. 2 (*c*) and FIG. 4). The spreading signal SG105 thus formed is outputted to the multiplier 105. Further, the 2 GHz chip clock SG103 is 16 times the transmitting data sequence SG101 of 125 Mbps, the spreading in this case being a sixteen times spreading.

In the multiplier 105, the carrier SG102 is modulated (frequency conversion with a 4 GHz center frequency) by the spreading signal SG105, and the carrier SG106 (FIG. 2(*e*) and FIG. 5) after modulation is outputted to the band pass filter 106. Unnecessary components are eliminated at the band pass filter 106 from the modulated carrier (frequency converting signal) having a main lobe ranging from about 3.0 to 5.0 GHz. Subsequently, a center portion of the main lobe is extracted (FIG. 6). This extracted signal is transmitted as the ultra wideband signal via the antenna 107.

Figure 11:
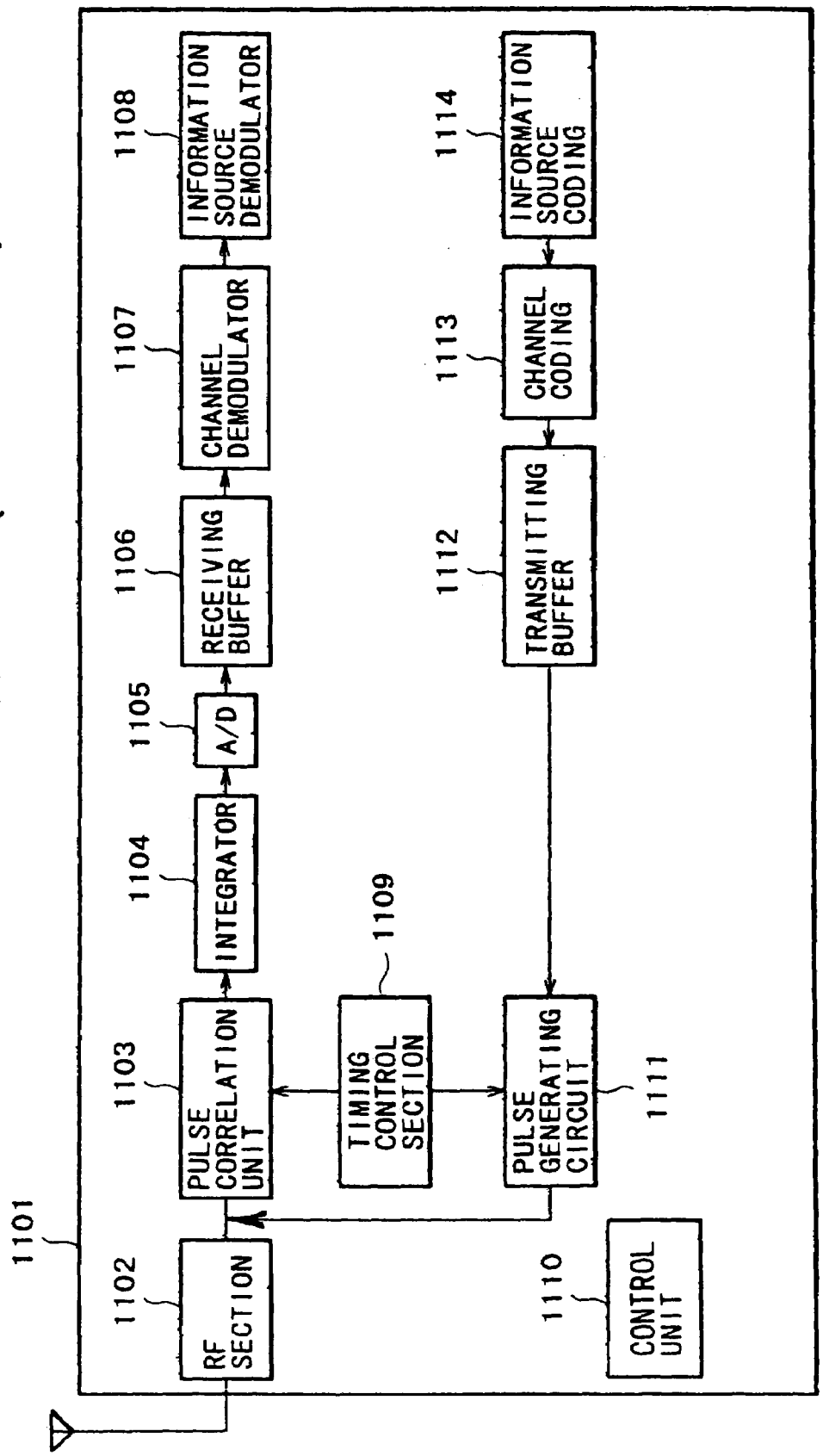
FIG. 11 shows an example of a configuration of a wireless communications terminal using the Ultra Wideband system.
Figure 12:
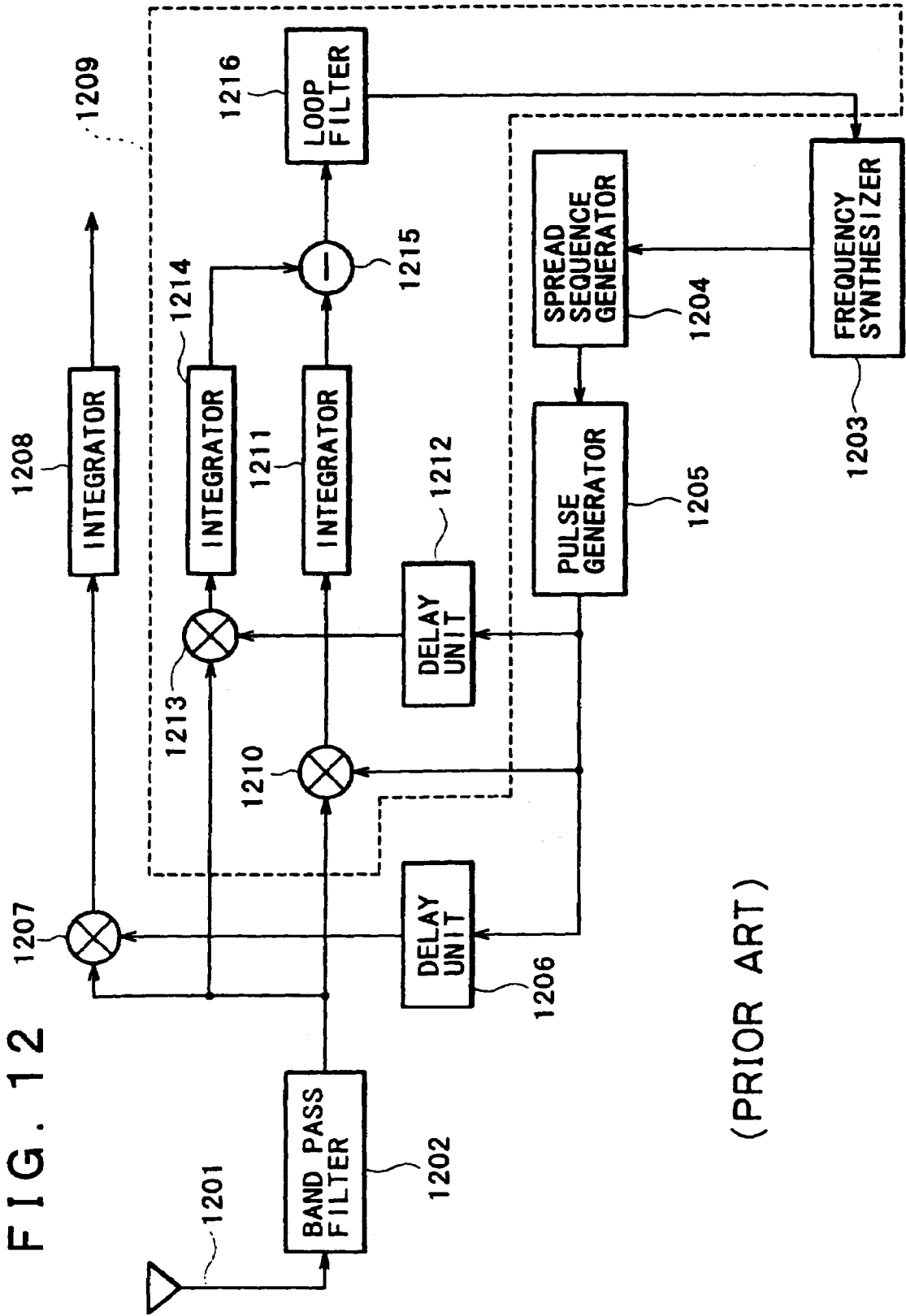
FIG. 12 is a block diagram showing a configuration of a receiver according to the Ultra Wideband system when a pulse generator is used.
Figure 13:
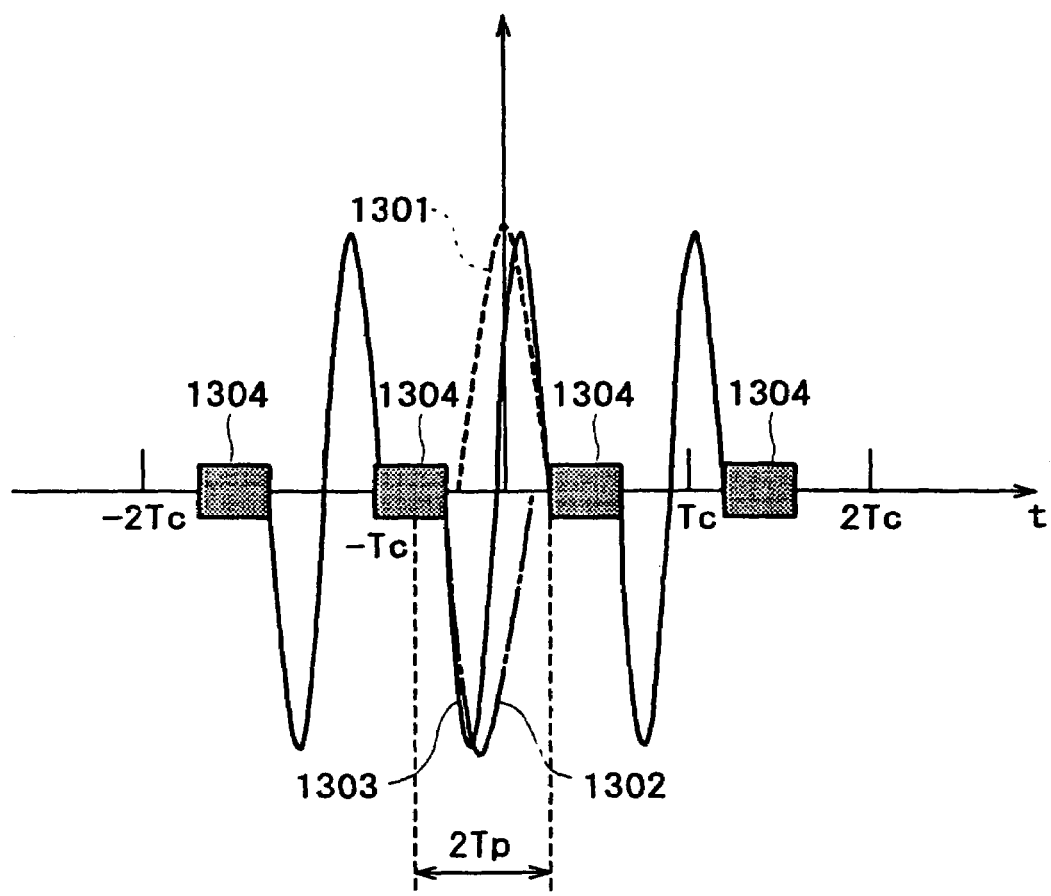
FIG. 13 is a diagram showing correlation characteristics in the receiver shown in FIG. 12.

The foregoing is the configuration of the transmitter according to the present embodiment. By comparison with the transmitter shown in FIG. 11, the transmitter according to the present embodiment has a characteristic of having no pulse generating circuit.

Figure 7:
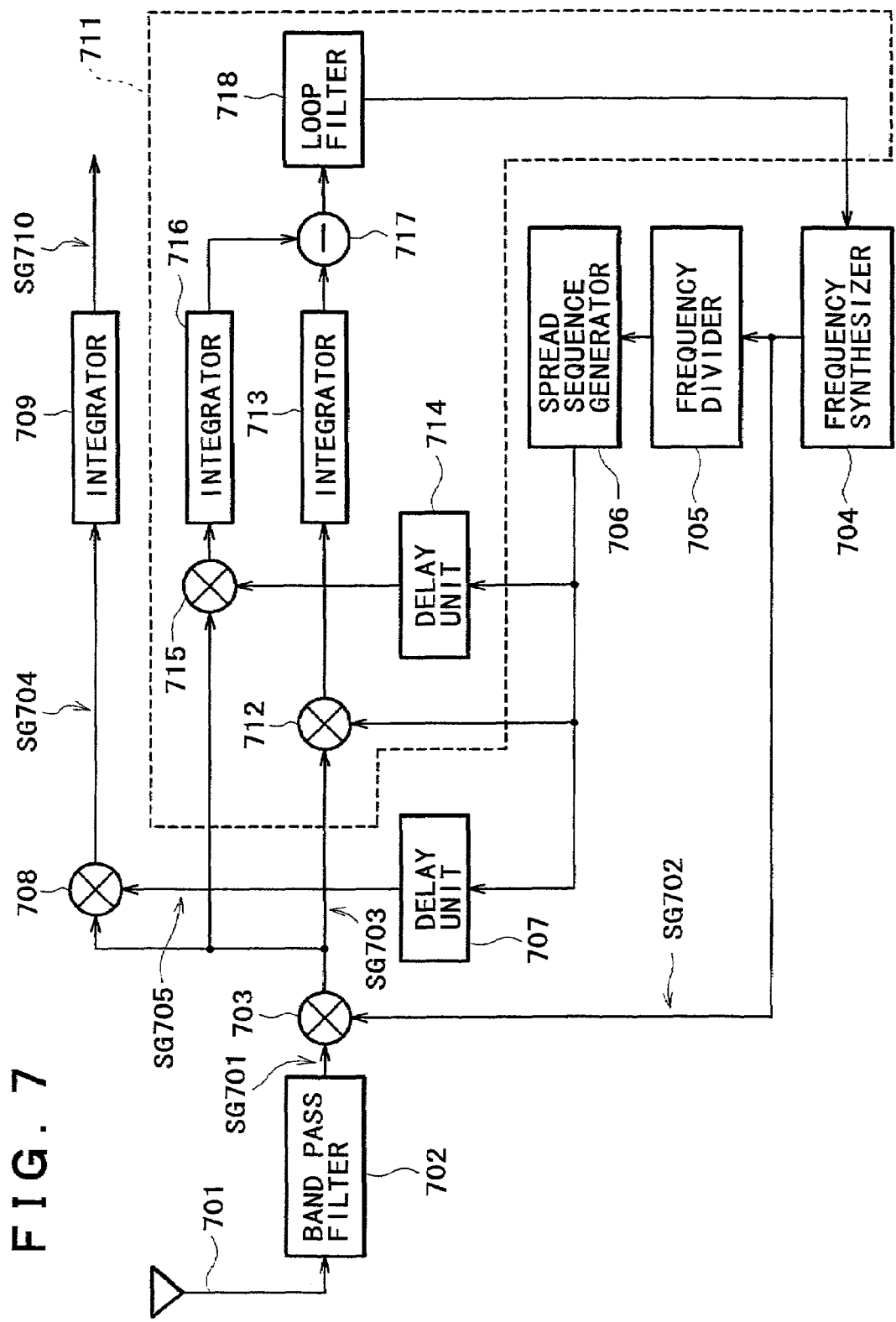
FIG. 7 is a block diagram showing a configuration of a a wireless communications device (receiver) according to a spread spectrum communications system associated with a preferred embodiment of the present invention.
Figure 8:
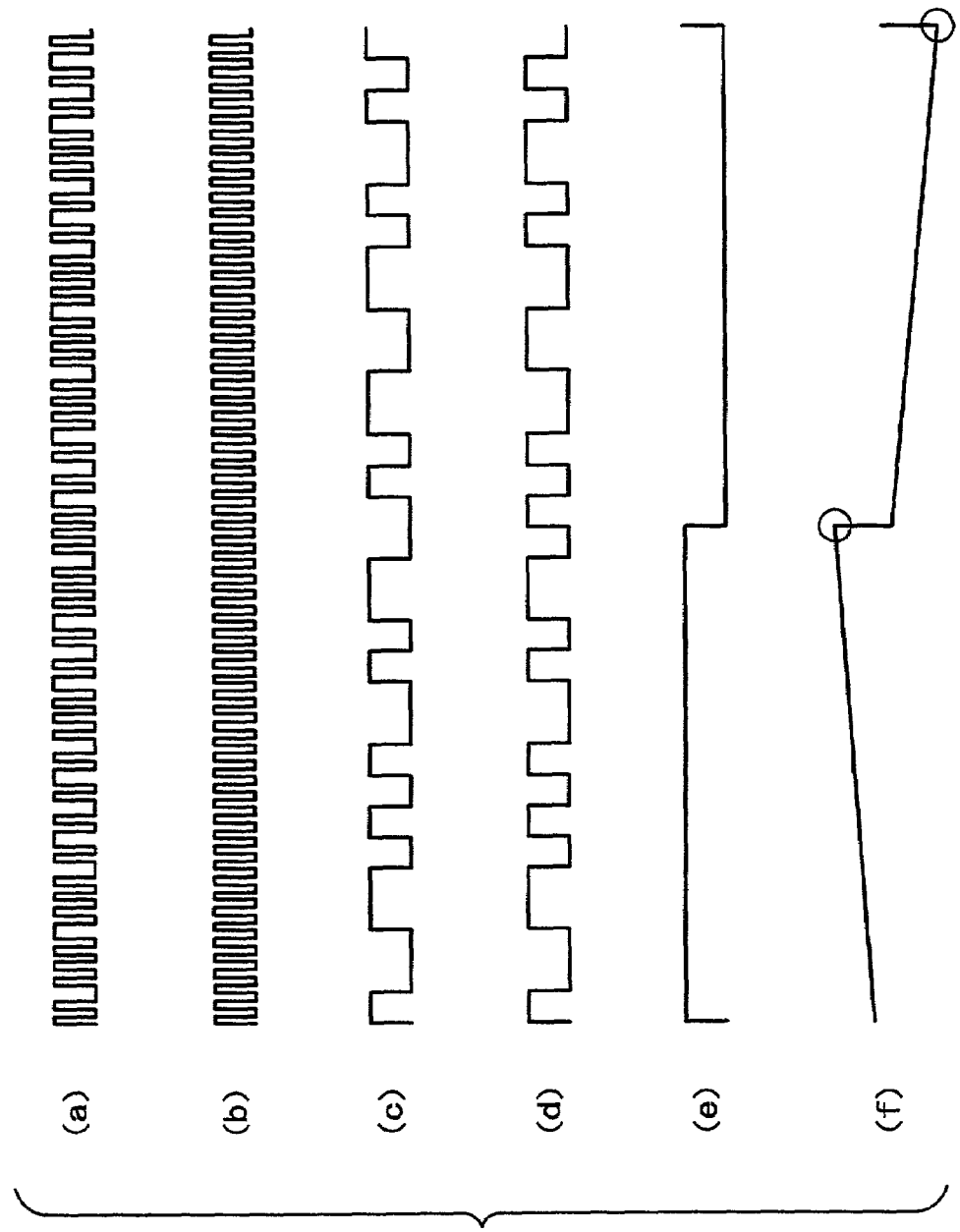
FIG. 8 is a diagram showing signals in the wireless communications device shown in FIG. 7
Figure 9:
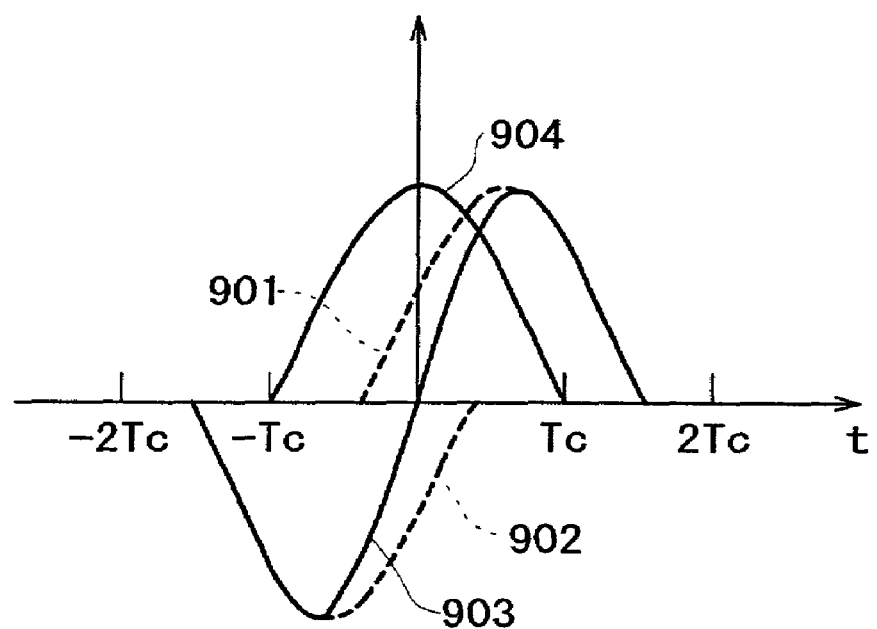
FIG. 9 is a diagram showing correlation characteristics in the wireless communications device shown in FIG. 7.
Figure 10:
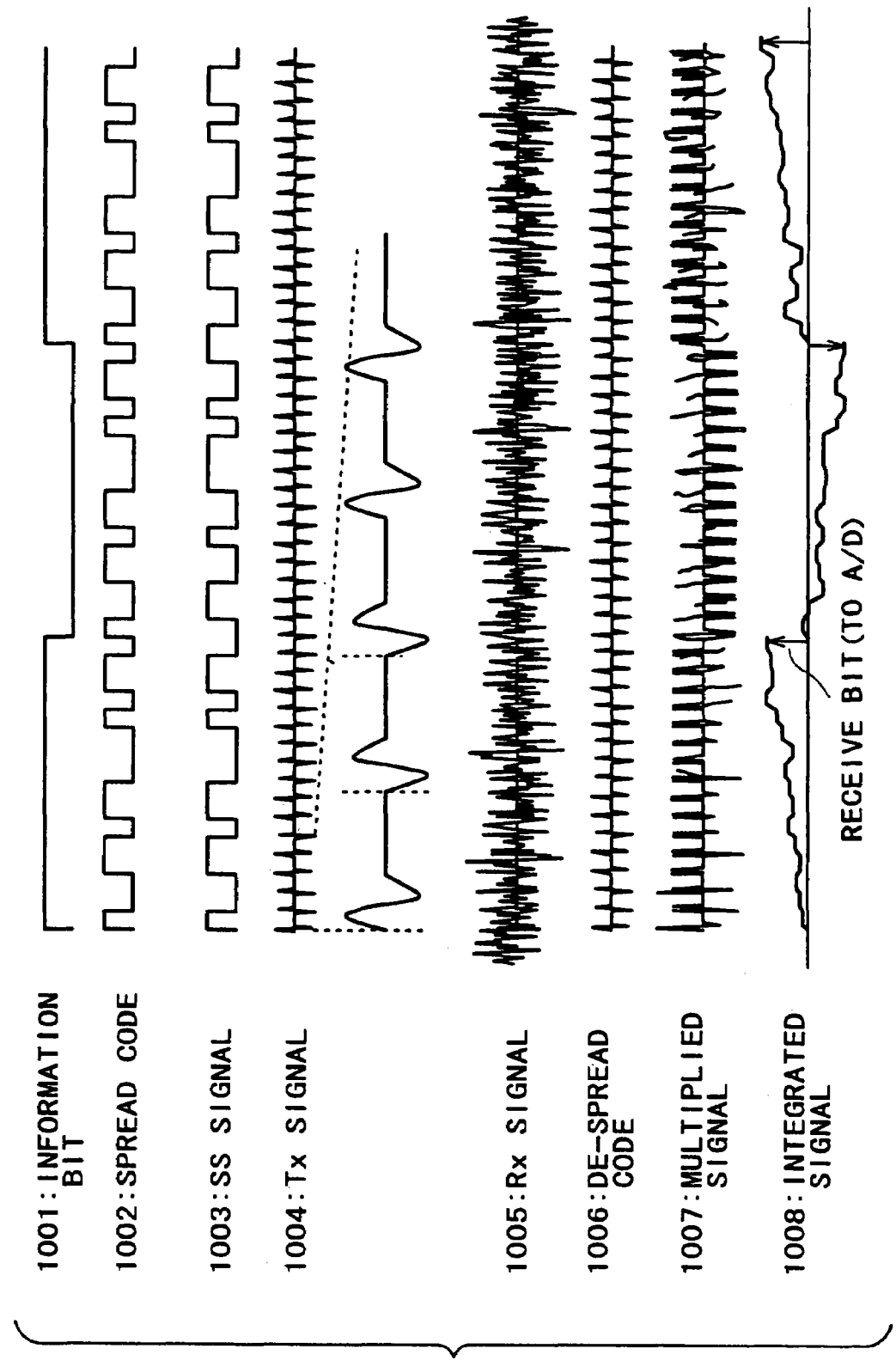
FIG. 10 shows examples of transmission using the Ultra Wideband system.

FIG. 7 is a block diagram showing a configuration of another wireless communications device (receiver) according to a spread spectrum communications system in accordance with another preferred embodiment of the present invention. FIG. 8 is a diagram showing a signal waveform at each section of the wireless communications device shown in FIG. 7. Furthermore, FIG. 9 is a diagram showing correlation characteristics in a main component 711 of a timing synchronous circuit with a so-called DLL (Delay Lock Loop) construction of the wireless communications device shown in FIG. 7.

Ultra wideband radio signals are received by an antenna 701. The signal received by the antenna 701, after its unnecessary components are eliminated by the band pass filter 702, is outputted to the multiplier 703 as the received signal (FIG. 8(*a*)). In the multiplier 703, the received signal SG701 is subjected to multiplication by the regenerated carrier SG702 (FIG. 8 (*b*)), frequency conversion is performed, and a received spreading signal SG703 (FIG. 8(*c*)) is outputted to multipliers 708, 715, and 712.

A divider 705 divides the frequency of a synthesizer 704 and outputs a chip clock to a spreading code generator 706, where the synthesizer 704 oscillates at a 4 GHz frequency and outputs a carrier SG702 (FIG. 8(*b*)) to the multiplier 703. In the divider 705, the 4 GHz frequency generated by the synthesizer 704 is divided by ½ (namely, two divisions) to produce the 2 GHz chip clock, which is to be outputted to the spreading code generator 706.

In this manner, the chip clock is generated by dividing the oscillating frequency in the synthesizer. Accordingly, the chip clock is synchronous with the carrier.

Using the frequency of the chip clock supplied from the divider 705, the spreading code generator 706 outputs the despreading code sequence (the same spreading code sequence as the spreading code sequence used in the wireless communications device shown in FIG. 1) to the delay units 707 and 714 as well as a multiplier 712.

In the delay unit 707, the despreading code sequence is delayed by a ½ chip rate and outputted to the multiplier 708. Also, in the delay unit 714, the despreading code sequence is delayed by a 1 chip rate and outputted to a multiplier 715. In the present embodiment, a chip period is equal to 1/chip rate and 500 ps (picosecond).

Accordingly, in the multiplier 708, a despreading code sequence SG705 (FIG. 8(*d*)) is multiplied by the received signal at a timing in the center of the chip interval and despread processing is performed so as to demodulate transmitting data that achieves timing synchronization in the end. In addition, in the multiplier 712, the spreading code sequence is multiplied by the received signal at a timing advanced by a ½ chip rate from the despreading code sequence SG705 and despread processing is performed. Further, in the multiplier 715, the spreading code sequence is multiplied by the received signal at a timing delayed by a ½ chip rate from the despreading code sequence SG705 and despread processing is performed.

The multiplication result SG704 of the multiplier 708 (despreading signal, FIG. 8(*e*)) is outputted to an integrator 709, integrated by the integrator 709 within a 8 ns (=1/125 MHz) data bit interval, and outputted as received data SG706 (FIG. 8(*f*), 904 in FIG. 9) The multiplication result of the multiplier 712 is outputted to an integrator 713 and integrated thereby, and outputted to a differentiator 717 (dotted line 902 in FIG. 9). The multiplication result of the multiplier 715 is outputted to an integrator 716 and integrated thereby, and outputted to the differentiator 717 (dotted line 901 in FIG. 9).

On the differentiator 717, a difference between the integrator 713 output and the integrator 716 output (solid line 903 in FIG. 9) is admitted and the difference is outputted to a loop filter 718. As clear from FIG. 9, the output (vertical axis) responds linearly to a phase shift (transverse axis). Namely, an S-curve characteristic is exhibited due to a receiving timing offset.

Accordingly, with regards to the difference, the output (difference) subjected to filtering in the loop filter 718 is fed back to the synthesizer 704. For example, in the characteristic shown in FIG. 9, there is outputted the value of zero that has a null receiving timing offset, and when the receiving timing offset is shifted forward or backward, a positive or negative value is outputted as a timing offset signal. Reference numeral 711 indicates a main part of a timing synchronous circuit (DLL: Delay Lock Loop) which performs the timing synchronization as described above.

In the synthesizer 704, the oscillating signal is controlled so that if the loop filter 718 output is a positive value, a generation phase of the spreading code sequence is slightly delayed, while, if it is a negative value, the generation phase of the spreading code sequence is slightly advanced. This operation results in making the loop filter 718 output (difference) zero when timing synchronization is achieved, so that the phase of the spreading code sequence becomes equal to the phase of the received signal, thus maximizing the despreading output of the multiplier 708 and demodulating the transmitting data in the condition wherein the timing synchronization is achieved.

In this manner, in accordance with the above mentioned embodiments, there is no conventional use of very fine pulses, hence, undesired signals are not irradiated and a spectrum can be generated by targeting to where it is desired to be radiated, thereby attaining efficiency. For example, it is possible to control the radiation level low at 3 GHz or less where receiving interference or causing interference is a matter of concern in some cases. Further, because of continuous transmission signals, an instantaneous transmission power can be controlled to low levels, while on the receiving end, there is no dead zone when making up the chip rate synchronous circuit, bringing about an advantage that the circuit can be simply constructed.

Further, in accordance with the above mentioned embodiments, inasmuch as the oscillating frequency of the synthesizer is divided to generate the chip clock, there is a synchronization between the chip clock and the carrier. Accordingly, the circuit for achieving synchronization with the chip clock (timing synchronous circuit) also can be used to achieve synchronization with the carrier, enabling the receiver to be made up with a simple circuit.

The present invention is not limited only to the above mentioned embodiments. According to the present invention, various types of other embodiments or combinations of features described in the above embodiments may be provided. For example, the frequencies and chip rates in the above mentioned embodiments are presented only for exemplary purpose, and it is to be understood that various changes and modifications may be made without departing from the scope of the subjoined claims.

Further, in the above mentioned embodiment, there is description relating to the case of using the multiplier when modulating transmission signals by the spreading code sequence and modulating the carrier by the spreading signal. It is to be understood that an EX-OR circuit may be used instead of the multiplier in the present invention.

Still further, in the above mentioned embodiments, at the transmitting side the oscillating signal of the synthesizer 101 is provided directly (that is, without dividing it (one division)) to the multiplier 105 as the carrier SG102, while, at the receiving side, the oscillating signal of the synthesizer 704 is provided directly (that is, without dividing it (one division)) to the multiplier 703 as the regenerated carrier SG702. Alternative arrangement may be used. That is, the oscillating signal of the synthesizer 101 and the oscillating signal of the synthesizer 704 can be respectively divided by m (m being an integer) and respectively provided to the multiplier 105 and the multiplier 703.

Furthermore, in the above mentioned embodiments, when the chip clock is generated by a frequency that is ½ of the carrier frequency. That is, the oscillating signals of the synthesizer 101 and the synthesizer 704 are divided by two in the divider 102 and the divider 705, respectively. Alternatively, in the present invention, division by an arbitrary integer n (n is not limited to two) can be performed on the divider 102 and the divider 705 provided that the spreading spectrum signal having a chip rate of several GHz is subjected to frequency conversion by the carrier that is synchronous with the chip clock so as to provide the transmission signal. It is to be understood that a frequency of the chip clock is several times the spread spectrum signal itself (for example, a rational number multiple in the form of n/m, 10 or less).

As described above, it is an advantage and feature of the present invention that, since the wireless communications device according to the present invention converts the frequency of the spreading spectrum signal having a chip rate of several GHz by using the carrier wave synchronous with the chip clock several times the spreading spectrum signal itself (a rational number multiple) and produces the transmission signal, at the transmitting side, the chip clock can be synchronized with the carrier wave, thereby enabling the circuit for synchronizing the chip clock to achieve the carrier synchronization as well.

It is also an advantage and feature of the present invention that, at the receiving side, the receiver can be configured with a simpler structure.

What is claimed is:

1. A transmitter for carrying out communications using ultra wideband signals, comprising:
    a synthesizer generating an oscillating signal of a frequency T, where T is a number;
    a divider generating a clock signal of a frequency T/n by receiving and dividing the oscillating signal;
    a spreading code generator generating a spreading code sequence signal using the clock signal;
    a first multiplier generating a spread spectrum signal by receiving a baseband signal and the spreading code sequence signal, and multiplying the baseband signal by the spreading code sequence signal; and
    a second multiplier generating a frequency converting signal by receiving one of the spread spectrum signal and the oscillating signal and a carrier wave signal of a frequency T/m, and by multiplying the spread spectrum signal by one of the oscillating signal or the carrier wave signal, the carrier wave signal being obtained by dividing the oscillating signal,
    in which n is a first integer and m is a second integer, the frequency T/m is between 1 GHz and 10 GHz, and the number n/m is a positive rational number which is less than or equal to 10.

2. A receiver for carrying out communications using ultra wideband signals, comprising:
    a synthesizer generating an oscillating signal of a frequency T, where T is a number;
    a divider generating a clock signal of a frequency T/n by receiving from the synthesizer the oscillating signal synchronous in timing with a carrier receiving signal and dividing the oscillating signal;
    a spreading code generator generating a despreading code sequence signal using the clock signal;
    a first multiplier generating a receiving spread spectrum signal by receiving a signal and multiplying the received signal by one of the oscillating signal or a regenerated carrier wave signal of a frequency T/m obtained by dividing the oscillating signal; and
    a second multiplier generating a despreading signal by multiplying the receiving spread spectrum signal by the despreading code sequence signal,
    in which n is a first integer and m is a second integer, the frequency T/m is between 1 GHz and 10 GHz, and the number n/m is a positive rational number which is less than or equal to 10.

3. A transmitting method for carrying out communications using ultra wideband signals, the method comprising:
    generating an oscillating signal of a frequency T, where T is a number;
    generating a clock signal of a frequency T/n by receiving and dividing the oscillating signal;
    generating a spreading code sequence signal using the clock signal;
    generating a spread spectrum signal by receiving a baseband signal and the spreading code sequence signal, and multiplying the baseband signal by the spreading code sequence signal; and
    generating a frequency converting signal by receiving one of the spread spectrum signal and the oscillating signal and a carrier wave signal of a frequency T/m, and by multiplying the spread spectrum signal by one of the oscillating signal or the carrier wave signal, the carrier wave signal being obtained by dividing the oscillating signal,
    i which n is a first integer and m is a second integer, the frequency T/m is between 1 GHz and 10 GHz, and the number n/m is a positive rational number which is less than or equal to 10.

4. A receiving method for carrying out communications using ultra wideband signals, the method comprising:
    generating an oscillating signal of a frequency T, where T is a number;
    generating a clock signal of a frequency T/n by receiving the oscillating signal synchronous in timing with a carrier receiving signal and dividing the oscillating signal;
    generating a despreading code sequence signal using the clock signal;
    generating a receiving spread spectrum signal by receiving a signal and multiplying the received signal by one of the oscillating signal or a regenerated carrier wave signal of a frequency T/m obtained by dividing the oscillating signal; and
    generating a despreading signal by multiplying the receiving spread spectrum signal by the despreading code sequence signal,
    in which n is a first integer and m is a second integer, the frequency T/m is between 1 GHz and 10 GHz, and the number n/m is a positive rational number which is less than or equal to 10.

* * * * *